Dec. 29, 1942. G. A. LYON 2,306,630
ORNAMENTAL WHEEL DISK AND MEANS FOR MOUNTING SAME
Filed July 29, 1937 3 Sheets-Sheet 1
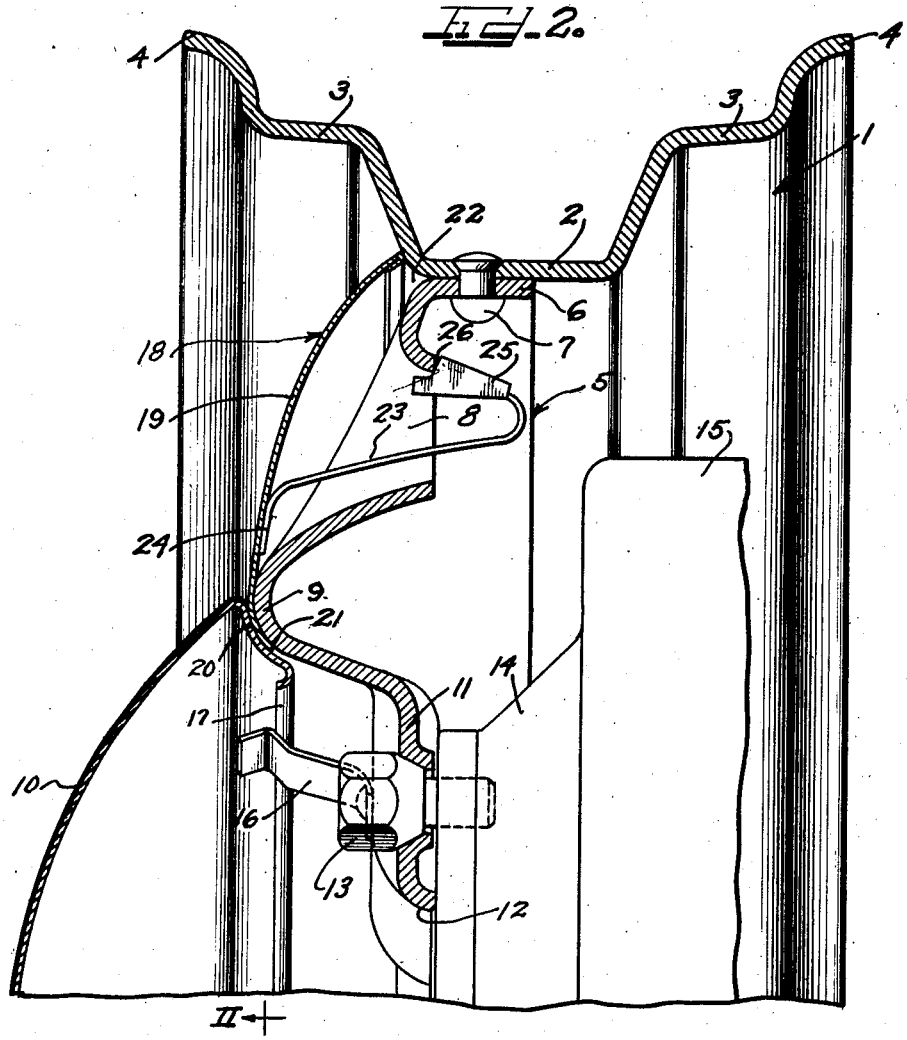
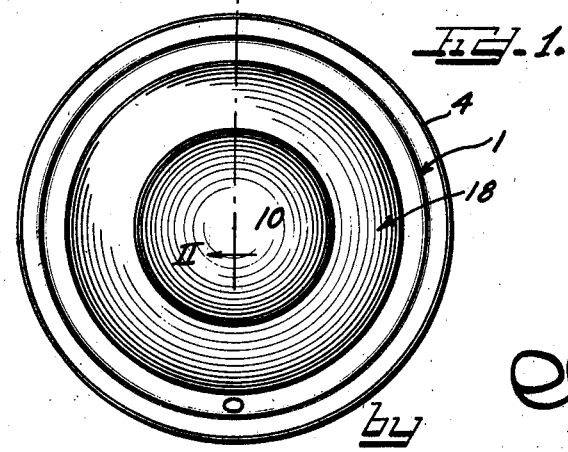
Inventor
GEORGE ALBERT LYON.

Dec. 29, 1942.   G. A. LYON   2,306,630
ORNAMENTAL WHEEL DISK AND MEANS FOR MOUNTING SAME
Filed July 29, 1937   3 Sheets-Sheet 2
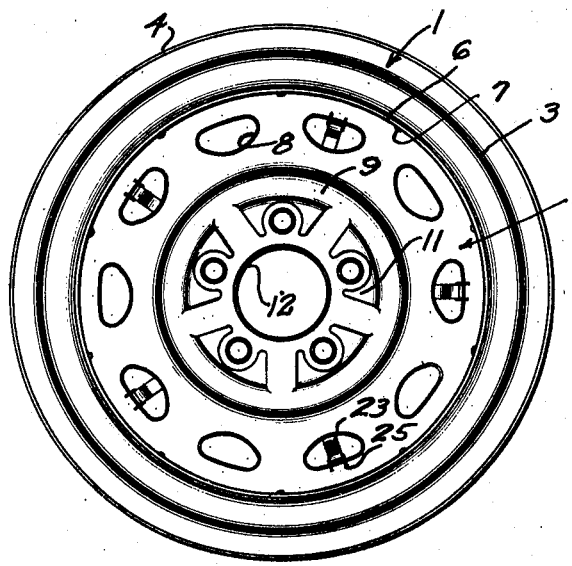
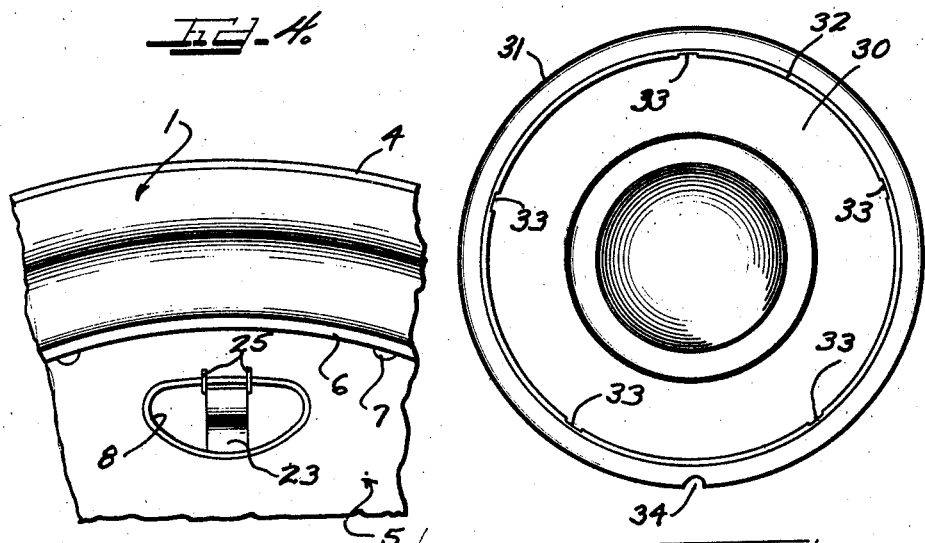
Inventor
GEORGE ALBERT LYON.

Dec. 29, 1942.     G. A. LYON     2,306,630
ORNAMENTAL WHEEL DISK AND MEANS FOR MOUNTING SAME
Filed July 29, 1937     3 Sheets-Sheet 3
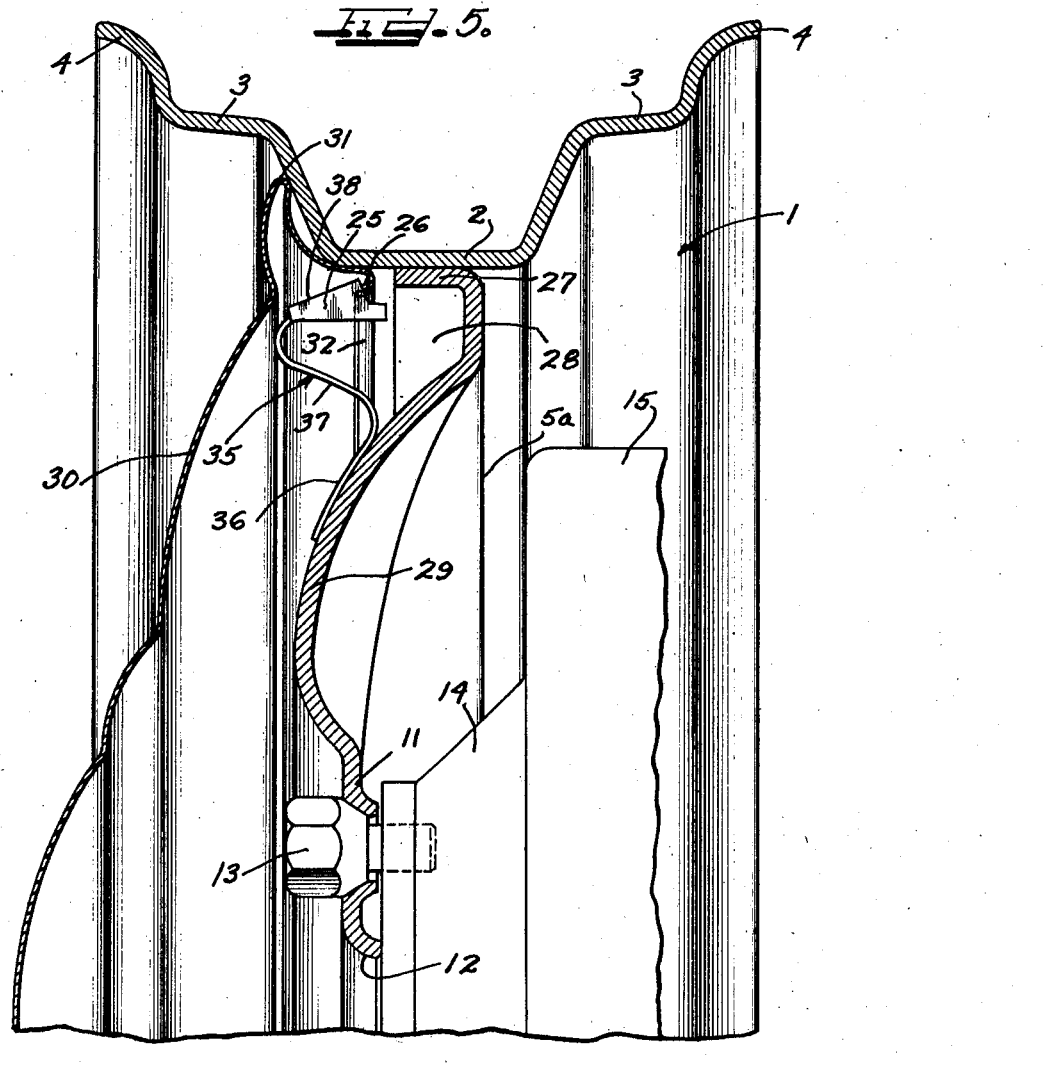
Inventor
GEORGE ALBERT LYON.
by Charles Still Attys.

Patented Dec. 29, 1942

2,306,630

UNITED STATES PATENT OFFICE 2,306,630

ORNAMENTAL WHEEL DISK AND MEANS FOR MOUNTING SAME

George Albert Lyon, Allenhurst, N. J.

Application July 29, 1937, Serial No. 156,279

14 Claims. (Cl. 301—37)

This invention relates to improvements in ornamental wheel disks and means for mounting the same, and more particularly, to an ornamental disk for attachment to the side surface of a vehicle wheel within the rim of the wheel to overlie the outer side surface of the disk or spoke portion of the wheel. This invention further relates to a novel means for securing an ornamental member on a vehicle wheel which renders the mounting of the ornamental member on the wheel very easy but which renders the removal of the ornamental member from the wheel very difficult. In other words, an easy-on hard-off means is provided for securing an ornamental member to a wheel.

This invention is a continuation in part of the subject matter of my copending application for "Ornamental wheel disks," Serial No. 757,781, filed December 17, 1934.

The present invention is shown and described herein in different forms associated with a vehicle wheel of the so called disk type, wherein the wheel normally includes a tire rim of the drop center type and a body part or central portion secured to the rim, this body part being centrally apertured to provide a hub opening, and extending from this aperture to the base flange of the rim to which it is secured in any suitable manner. However, it is to be understood that while the present invention embodies an ornamental disk for association with a vehicle wheel and also an ornamental disk and wheel structure, where in each instance a disk wheel is highly desirable, with relatively minor structural changes the invention can equally well be associated with or incorporate wheels of other types.

In the manufacture on a large production basis of wheels of the disk type, the body or central supporting part is usually blanked or pressed out of relatively heavy gauge sheet material, and so it is not feasible to provide the outer side surface of this part with a high gauge finish. To provide a finish on the body part of the wheel that would be in keeping with the other appointments of the vehicle, necessitates grinding and buffing operations after the forming of the parts, thereby adding so materially to the cost of the part as to render the same prohibitively expensive, not only in the original manufacture but also to replace after injury. In addition, the body or central supporting parts of the disk wheel are sometimes of solid construction of substantially the same thickness throughout, and in other cases they are provided with apertures and indentations to cause such parts to simulate both.

While ornamental members have been secured to vehicle wheels in a wide variety of manners, they have not been entirely satisfactory from the standpoint of the purchaser of the vehicle, who had to remove and replace them from time to time. From this standpoint, a vehicle wheel disk should be capable of being mounted in a very easy manner and without the application of a great deal of force. On the other hand, when a wheel disk is once on the wheel it is important that the wheel disk be relatively hard to remove since otherwise, the wheel disk is apt to become loosened when the vehicle is traveling over rough roads, and fall off. While a purchaser of a vehicle would like to be able to remove an ornamental member or wheel disk with as little effort as he mounts it, he would much prefer to be sure that the wheel disk would not become jarred loose when the vehicle is in motion. It may therefore be said that the requisite of a commercially desirable ornamental member for vehicle wheels is one which may be mounted in a simple manner with the application of a relatively small force and be capable of being removed only through the application of a relatively great force. In other words, an easy-on hard-off securing means is desirable for retaining the ornamental member on a vehicle wheel.

With the foregoing in mind, it is an object of this invention to provide an ornamental disk of relatively thin sheet material and having an external surface finished or configurated in substantially any desired manner to harmonize with the other structures and adornments of the vehicle, which disk element is economical and expeditious to manufacture and may be associated with the wheel in a very ready manner.

Another object of this invention is to provide an ornamental disk to overlie a portion of the outer side surface of a wheel within the rim of the wheel, which disk may be associated with a slight change of structure with either a solid, smooth surfaced central part of a wheel or a central part of a wheel made in simulation of spokes.

Also an object of this invention is the provision of an ornamental disk and wheel structure wherein the attaching means for holding the disk upon the wheel may either be carried by the disk or by the wheel as may be deemed advisable.

Another object of this invention is the provision of an ornamental disk having means thereon for engagement through the spokes of the central portion of a wheel to hold the disk in position upon the wheel.

Another and still further object of the present invention is to provide a novel ornamental member having means associated therewith for making an easy-on hard-off securing engagement with a vehicle wheel.

A still further object of the present invention is to provide novel means for securing an ornamental member to a wheel.

Other objects and features of this invention will more fully appear from the following description taken in conjunction with the accompanying drawings in which:

Figure 1 is a side view of an ornamental wheel disk structure embodying features of this invention;

Figure 2 is an enlarged fragmentary sectional view taken substantially on the line II—II of Figure 1 looking in the direction indicated by the arrow;

Figure 3 is an enlarged inside elevational view of the wheel and disk structure seen in Figure 1;

Figure 4 is an enlarged fragmentary inside elevation of a portion of the structure of Figure 3;

Figure 5 is an enlarged fragmentary vertical sectional view, similar to Figure 2, but showing a different form of disk and wheel structure, wherein the disk covers the entire outer side surface of the wheel inside the rim and the holding means for the disk are carried by the central supporting portion of the wheel; and Figure 6 is an inside elevational view of the disk shown in Figure 5.

I have illustrated in the above mentioned drawings two modifications of my invention, in each of which I have provided an ornamental disk for wheel structures, which disk is adapted to be snapped or pressed axially into retained engagement with the wheel so as to be held in place on the wheel by means concealed by the disk.

In one embodiment of my invention which is illustrated in Figures 1 to 4 of the drawings, the reference numeral 1 indicates in general a drop center rim or rim part of a wheel; this rim part including a base 2, a pair of intermediate flanges 3—3, and a pair of outer edges 4—4. The wheel also includes a central supporting portion or body part indicated in general by the reference numeral 5, which part includes an inwardly turned peripheral flange 6 secured to the base 2 of the rim in any suitable manner, such as by rivets 7. In this instance, the body part 5 is also provided with a plurality of apertures or openings 8 in simulation of the spaces between spokes, the portion of the metal of the body part adjacent each aperture being depressed inwardly, as seen in Figure 2, to give the general external appearance of a spoked wheel. Inside the openings 8 the body part is provided with an outwardly projecting annular bulge 9 which, in addition to other functions, also acts as a seat for hub cap 10. Radially inward of the bulge 9, the body part is provided with an inwardly offset fastening flange 11 provided with a central hub opening 12 also provided with a plurality of apertures for the accommodation of a series of fastening bolts 13 by means of which the wheel may be attached to the axle part 14 having associated therewith the usual brake drum 15. The fastening flange 11 is provided with a series of spaced spring clips 16 extending outwardly in position to engage the inner curl periphery 17 of the hub cap 10 to retain the hub cap removably in position.

As stated hereinabove, it is prohibitively expensive to provide the outer surface of the body part 5 of the wheel with a high grade finish in keeping with the finish on other parts of the vehicle, it being customary to provide this surface with a relatively economical coating of paint, lacquer, enamel or the equivalent. Accordingly, it is found more economical and satisfactory to provide an ornamental disk for disposition over this outer side surface of the body part.

In this instance, I have provided an ornamental disk, generally indicated by reference numeral 18 which includes a transversely arcuate body portion 19, the inner peripheral edge 20 of which is shaped to seat on the bulge 9 of the body part 5. The inner peripheral edge of portion 20 defines a central aperture 21 slightly smaller than the maximum circumference of the hub cap 10. The central aperture 21 of disk 18 is thus of sufficient size to permit free access to the wheel fastening bolt 13 upon the removal of the hub cap 10. The outer edge portion of disk 18 need not be notched or apertured to accommodate a valve stem, because as seen in Figure 1, the disk does not extend outwardly sufficiently to overlie the valve aperture in the rim. However, it will be noted that the disk 18 does extend radially outwardly sufficiently to cover the crack 22 between the base 2 of the rim and the flange 6 of the body part 5, so that dirt or debris cannot accumulate in this crack or gap. Portion 19 of disk 18 is provided on its rear face with a plurality of spring clips 23 each having a downwardly turned portion 24 welded or otherwise secured to the disk. In this instance, there are five of the spring clips at equally spaced intervals around the disk, each clip being designed to extend through one of the apertures 8 of the body part of the wheel. The inner portion of each of these spring clips 23 is provided with a reverse bend and the side wall is folded outwardly to provide a channeled engaging element 25. It will be noted from the showing in Figure 2 that each engaging element 25 is provided with the proper slope to facilitate the entrance of the clip through an opening 8 and also with the outwardly sloping contact edge 26 which is inclined obliquely toward the median plane of the wheel and the rim. The engaging element 25 is shouldered beneath the contact edge 26 for positive engagement with the body portion at the axially inward and radially outward portion of an apertural opening 8. With the contact element 25 being urged outwardly by the reverse bend in the spring clip and the sloping contact edge 26, this contact edge keeps continually working outwardly while the vehicle is in operation to secure definite and positive engagement with the hub portion. Thus, the disk is maintained in rigid position upon the wheel.

In order to mount the wheel disk 18 on the wheel, the hub cap 10 is first removed and then the disk moved axially inwardly of the wheel into desired position thereon. The spring element 23 being positioned during the mounting operation, opposite the apertures 8 through which they extend in mounted position. It will of course, readily be observed that due to the fact that the points of flexure of the outer ends of the element 23 and due to the fact that a cam surface is provided by the main body part of portion 25, the outer end of each spring element 23 is easily and readily flexed as it moves into desired position upon the wheel. When the wheel disk 18 is being removed from the wheel however, it will be observed that the point of flexure of the outer end of the spring element 23 are now to the rear of their point of engagement taken with respect to the direction of their intended movement with the result that the outer ends of the spring element are very difficult to flex by the application of an axially outwardly applied force. Due to the fact that the contact edge 26 is outwardly sloping, it is possible to flex the spring element upon the application of a relatively great axially outwardly applied force. The fact that the securing means for the wheel disk is an easy-on hard-off arrangement is of course due to the relative position of the point of flexure of the outer end of each spring element 23 with respect to the point of contact of the sloping contact edge 26. Thus, whenever it is desired to remove the disk 18 from the wheel, it is necessary to either apply a relatively great axially applied force such as may be obtained by inserting a screwdriver between the rim and the outer edge of the wheel disk 18 and prying the disk loose or else by releasing a number of the contact elements from the inside of the wheel.

In Figures 5 and 6 I have shown another disk and wheel structure. In this instance, the wheel has the same tire rim above described, but includes a body part 5a of different construction from the body part 5. The main difference in construction resides in the provision of an axially outwardly extending peripheral flange 27 on the body part which is secured to the base 2 of the rim in any desired manner, such as by riveting or welding. At a sufficient distance radially inwardly of flange 27, to leave a groove-like pocket 28 adjacent this flange, the body part is provided with a plurality of outwardly arced portions 29 in simulation of spokes, and the body part is also provided with a fastening flange 11 at its central portion offset inwardly towards the median vertical plane of the wheel, the fastening flange having the usual hub opening 12 in the center thereof. The wheel may be mounted upon a wheel in the manner described in connection with the description of the first embodiment of the invention.

In this instance, I have shown a disk 30, which, of necessity, must be removable from the wheel in a ready manner because the disk is made to cover the entire side surface of the body part of the wheel together with the portion of the rim, including the hub opening. As previously pointed out, however, it is necessary that the securing means for this disk be of such character that the disk cannot be readily jarred loose when the vehicle is in motion. As may be seen best in Figure 5 of the drawings, the outer periphery of the disk is provided with a reverse bend 31 which contacts with the rim 1. The disk curves inwardly from the bend 31 beneath the base 2 of the rim and terminates in an outwardly bent annular flange 32, this flange being recessed or notched at spaced intervals as indicated at 33 for the accommodation of attaching means. The reversely bent portion 31 of the disk is provided with a suitable notch 34 through which the valve tube may extend.

The attaching means for the disk in this instance are carried by the body part of the wheel and comprise a series of spring clips 35, which are of a size to fit within the notches 33 in the disk. The spring elements 35 are substantially similar to the spring elements 23 in regard to their outer portion with the exception that they are mounted in the reverse manner. More particularly, the spring elements 35 have a tail portion 36 which is adapted to intimately overlie a portion of the body part 5a of the wheel and be welded or otherwise suitably secured thereto. The central portion 37 of the spring elements 35 extend obliquely outwardly and then are bent sharply back on themselves to terminate in the end portion 25 which is identical with the end portions 25 as shown in Figure 2 of the drawings. As previously pointed out, the end portion 25 includes an obliquely sloping contact edge 26 which is adapted to engage the flange 32 of the wheel disk 30 within the notches 33.

From the description of the elements employed on the embodiment of the invention illustrated in Figures 1 to 4 of the drawings, it will at once be understood that as the wheel disk 30 is moved axially into position on the wheel, the ends 25 of the spring elements 35 are cammed inwardly as the flange 32 rides over the forward slope 38 of the ends 25. Due to the fact that the point of flexure of the ends 25 of the spring elements 35 is to the rear of the point at which the flange 32 engages the forward slope 38, the springs are flexed by a relatively small axially inwardly applied force. As the disk 30 continues to move into position on the wheel, it will be seen that the contact slope 26 will snap up behind the flange 32 to securely hold the disk on the wheel.

To remove the disk 30 from the wheel it is necessary to apply a relatively great force to flex the spring since the point of flexure is ahead of the point of engagement of contact slope 26 with respect to the flange 32 taken relative to the direction of intended movement. A substantially axially applied force may be obtained by forcing a screw driver or other suitable working tool between the outer edge 31 of the disk 30 and the rim 1 and prying the disk 30 outwardly.

From the above description, it will be seen that I have provided an extraordinarily simple, yet effective method and means for mounting ornamental members on wheels. The novel means includes the highly desirable characteristic which requires only a slight deformation force to assemble the ornamental member or members on the wheel, but which requires a relatively great force to dismount the member or members from the wheel.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. A combination comprising two members, means for detachably securing one member to the other, said means including a flexible spring element having a base portion secured to one of said members, a first body portion extending from said base portion and defining a point of flexure therewith, a second body portion extending obliquely back over said first body portion defining a second point of flexure therewith, and a third portion extending from said second portion substantially at a right angle thereto and arranged to abut an edge portion of the other of said members, said spring element being flexed at both of said flexure points when said members are being separated.

2. A combination comprising two members, means for detachably securing one member to the other, said means including a flexible spring element having a base portion secured to one of said members, a first body portion extending from said base portion and defining a point of flexure therewith, a second body portion extending obliquely back over said first body portion and defining a second point of flexure therewith, and a third portion extending from said second portion substantially at a right angle thereto and arranged to abut an edge portion of the other of said members, said second body portion diverging away from said first body portion about said second point of flexure as said members are separated.

3. The combination comprising a wheel member, an ornamental member for disposition on the outer side of the wheel member, and means for securing said ornamental member to said wheel member including a plurality of annularly disposed flexible spring elements secured to one of said members each of said spring elements including a first body portion, a second body portion folded obliquely back over said first body portion, and an end portion extending abruptly away from said second body portion and engageable with the other of said members, said second body portion being lifted away from said first body portion when said members are being separated to make an easy-on, hard-off securing engagement with a portion of said wheel.

4. In combination, a wheel body member, a cover member and a plurality of spring clips for mounting the cover on the wheel, each clip comprising a base portion attached to one of said members, an intermediate body portion extending angularly from said base portion, a second body portion extending in the opposite direction from said intermediate portion, said second portion being shorter than said intermediate portion, and an end portion having a surface extending toward said intermediate portion at a substantial angle to said second body portion, one of said members having an edge portion engaging said end surface, said edge tending to bring said body portions of the clip together on application of the cover, and tending to separate the same on removal of the cover.

5. In combination, a wheel body member, a cover member and a plurality of spring clips for mounting the cover on the wheel, each clip comprising a base portion attached to one of said members, an intermediate body portion extending angularly from said base portion, a second body portion extending in the opposite direction from said intermediate portion and spaced therefrom, said second portion being shorter than said intermediate portion, and an end portion having a surface extending toward said intermediate portion at a substantial angle to said second body portion, one of said members having an edge portion engaging said end surface, the angle between said surface and said second body portion being such that any outward displacement of said cover member from said wheel body member causes said body portions of said spring clips to spread further apart.

6. In combination, a wheel body member, a cover member and a plurality of spring clips for mounting the cover member on the wheel, each clip comprising a base portion attached to one of said members, an intermediate body portion extending angularly from said base portion, a second body portion extending in the opposite direction from said intermediate portion, said second portion being shorter than said intermediate portion, and an end portion having a surface extending toward said intermediate portion at a substantial angle to said second body portion, one of said members having an edge portion engaging said end surface, said surface of said end portion being at such an angle to said second body portion as to resist accidental displacement, by the separation of said body portions and to thereby make it difficult to remove said cover member.

7. In combination, a wheel body member, a cover member and a plurality of spring clips for mounting the cover on the wheel, each clip comprising a base portion attached to one of said members, an intermediate body portion extending angularly from said base portion, a second body portion extending in the opposite direction from said intermediate portion, said second portion being shorter than said intermediate portion, and an end portion having a surface extending toward said intermediate portion at a substantial angle to said second body portion, one of said members having an edge portion engaging said end surface with said end surface disposed vertically behind said edge portion, said end portion being constructed and arranged so as to pull said body portions apart upon any tendency to displace accidentally said cover member from the wheel.

8. In combination, a wheel body member, a cover member and a plurality of spring clips for mounting the cover on the wheel, each clip comprising a base portion attached to one of said members, an intermediate body portion extending angularly from said base portion, a second body portion extending in the opposite direction from said intermediate portion, said second portion being shorter than said intermediate portion, and an end portion having a surface extending toward said intermediate portion at a substantial angle to said second body portion, one of said members having an edge portion engaging said end surface, said edge portion tending to bring said body portions of the clip together on application of the cover to the wheel body member and also tending to lift said end portion relative to said intermediate portion upon any tendency to jar loose accidentally said cover member from the wheel.

9. The combination comprising a wheel including a body part, an ornamental cover member disposed on the outer side of said wheel body part and being dished so that the body part projects axially into the same, and spring catches for retaining said cover member on said wheel body part, each of said catches comprising a strip of spring metal fixed at one end to one of said parts and having a substantially goose-neck body portion having one leg extending diagonally away from the wheel axis and a second leg providing an inclined surface at a substantial angle to said diagonal portion and which surface extends substantially in a radial direction, said body portion extending generally in an axial direction away from said inclined surface and then in a generally radial direction to its point of attachment to the cooperating part carrying the same, said second leg tending to lift outwardly relative to said diagonal leg upon any tendency to displace accidentally said cover member from the wheel.

10. In combination, a wheel body member, a cover member and a plurality of spring clips for mounting the cover member on the wheel, each clip comprising a base portion attached to one of said members, an intermediate body portion extending angularly from said base portion, a second body portion extending in the opposite direction from said intermediate portion and spaced therefrom, said second portion being shorter than said intermediate portion, and an end portion having a surface extending toward said intermediate portion at a substantial angle to said second body portion, one of said members having an edge portion engaging said end surface, the angle between said surface and said second body portion being such that said body portions of the spring clips are caused upon any tendency of the cover member falling off the wheel to spread apart to retain the cover member on the body member.

11. In combination, a wheel body member, a cover member and a plurality of spring clips for mounting the cover member on the wheel, each clip comprising a base portion attached to one of said members, an intermediate body portion extending angularly from said base portion, a second body portion extending in the opposite direction from said intermediate portion, said second portion being shorter than said intermediate portion, and an end portion having a surface extending toward said intermediate portion at a substantial angle to said second body portion, one of said members having an edge portion engaging said end surface, said surface of said end portion being at such an angle to said second body portion as to lift said end portion outwardly relative to said second body portion upon any tendency of the cover member to become accidentally displaced from the wheel.

12. The combination of claim 4 further characterized by the body member comprising a circular metal shell with the base portions of the spring clip fastened thereto.

13. The combination of claim 5 further characterized by the wheel body member having a depressed portion with the base portion of each of the clips extending radially thereof and being fastened thereto.

14. The combination of claim 6 further characterized by the body member comprising a metal shell shaped to simulate spokes with the base portion of each of the spring clips extending radially thereon and being fastened thereto.

GEORGE ALBERT LYON.